United States Patent [19]

Magee

[11] 3,914,417

[45] Oct. 21, 1975

[54] INSECTIDICAL N-HYDROCARBOYL PHOSPHOROAMIDOTHIOATES AND PHOSPHOROAMIDODITHIOATES

[75] Inventor: Philip S. Magee, Ignacio, Calif.

[73] Assignee: Chevron Research Company, San Francisco, Calif.

[22] Filed: July 11, 1974

[21] Appl. No.: 484,912

Related U.S. Application Data

[63] Continuation-in-part of Ser. No. 317,478, Dec. 21, 1972, Pat. No. 3,845,172, which is a continuation-in-part of Ser. No. 148,139, May 28, 1971, abandoned, which is a continuation-in-part of Ser. No. 13,846, Feb. 24, 1970, Pat. No. 3,716,600, which is a continuation-in-part of Ser. No. 810,383, March 25, 1969, abandoned.

[52] U.S. Cl. .............................. 424/219; 424/220
[51] Int. Cl.² ........................................... A01N 9/36
[58] Field of Search ............ 424/220, 219; 260/956, 260/957

[56] References Cited

UNITED STATES PATENTS

| | | | |
|---|---|---|---|
| 3,201,446 | 8/1965 | Tolkmith | 260/959 |
| 3,309,266 | 3/1967 | Magee | 260/959 |
| 3,649,723 | 3/1972 | Magee | 260/957 |
| 3,702,890 | 11/1972 | Aichenegg | 424/220 |

*Primary Examiner*—Albert T. Meyers
*Assistant Examiner*—D. W. Robinson
*Attorney, Agent, or Firm*—J. A. Buchanan, Jr.; John Stoner, Jr.; Raymond Owyang

[57] ABSTRACT

N-hydrocarboyl derivatives of O,S-dihydrocarbylphosphoroamidothioates and S,S-dihydrocarbylphosphoroamidodithioates have a high degree of insecticidal activity with relatively low mammalian toxicity.

20 Claims, No Drawings

INSECTICIDAL N-HYDROCARBOYL PHOSPHOROAMIDOTHIOATES AND PHOSPHOROAMIDODITHIOATES

CROSS-REFERENCE TO RELATED APPLICATIONS

This application is a continuation-in-part of U.S. Ser. No. 317,478, filed Dec. 21, 1972, now U.S. Pat. No. 3,845,172, which, in turn, is a continuation-in-part of U.S. Ser. No. 148,139, filed May 28, 1971, now abandoned, which, in turn, is a continuation-in-part of U.S. Ser. No. 13,846, filed Feb. 24, 1970, now U.S. Pat. No. 3,716,600, which, in turn, is a continuation-in-part of U.S. Ser. No. 810,383, filed Mar. 25, 1969, now abandoned.

DESCRIPTION OF THE PRIOR ART

U.S. Pat. No. 3,309,266 teaches that O-alkyl-S-alkyl phosphoroamidothioates are insecticidal. U.S. Pat. No. 3,649,723 teaches that O-alkyl-S-unsaturated hydrocarbylphosphoroamidothioates are insecticidal. U.S. Pat. No. 3,201,446 teaches that O,O-diethyl-N-trichloroacetylphosphoramidothioate [N-(diethoxyphosphinothioyl)-2,2,2-trichloroacetamide] is useful as an insecticide. Russian Pat. No. 253,483, issued on Sept. 30, 1969 to G. V. Protopopova et al., discloses the use of O,S-dialkyl-N-alkylthiocarbonylphosphoroamidothioates, e.g.,

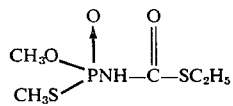

as insecticides. L. Almasi et al., Chem. Ber. 100 2626 (1967) and Chem. Ber. 99 3293 (1966), discloses O-ethyl-S-methyl-N-benzoylphosphoramidothioate, O-ethyl-S-methyl-N-p-chlorobenzoylphosphoroamidothioate and O-ethyl-S-methyl-N-p-methylbenzoylphosphoroamidothioate.

DESCRIPTION OF INVENTION

According to this invention it has been generally found that N-acyl derivatives of O-hydrocarbyl-S-hydrocarbyl phosphoroamidothioates and S-hydrocarbyl-S-hydrocarbyl phosphoroamidodithioates combine a high degree of insecticidal activity with relatively low mammalian toxicity. This finding is especially surprising since structural modifications which decrease mammalian toxicity normally also decrease insecticidal activity proportionately. This unique combination may permit these novel acylated derivatives to be used to control insects in environments in which the corresponding non-acylated compounds could not be used.

The phosphoramidothioates and phosphoroamidodithioates of this invention are represented by the formula (I)

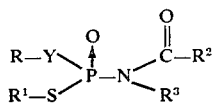

wherein R and $R^1$ individually are alkyl, alkenyl or alkynyl of up to 6 carbons, $R^2$ is hydrogen, alkyl of 1 to 18 carbon atoms, cycloalkyl of 3 to 8 carbon atoms, alkenyl of 2 to 18 carbon atoms or alkynyl of 3 to 18 carbon atoms, $R^3$ is hydrogen or alkyl of 1 to 6 carbon atoms, and Y is oxygen or sulfur.

Representative alkyl groups which R, $R^1$ and $R^3$ may represent include methyl, ethyl, propyl, isopropyl, butyl, isobutyl, t-butyl, pentyl, sec-pentyl and hexyl. Representative alkenyl of 3 to 6 carbon atoms which R and $R^1$ may represent include allyl, 2-butenyl, isobutenyl, 3-hexenyl, etc. Representative alkynyl of 3 to 6 carbon atoms which R and $R^1$ may represent include 2-propynyl, 2-butynyl, 3-hexynyl, etc. Preferred R and $R^1$ groups are alkyl of 1 to 3 carbon atoms, especially methyl. The preferred $R^3$ group is hydrogen.

Representative alkyl $R^2$ groups include methyl, ethyl, n-propyl, isopropyl, n-butyl, t-butyl, amyl, heptyl, 3-ethylamyl, 2-methylhexyl, n-hexyl, n-octyl, 4-methylheptyl, n-nonyl, n-decyl, 5-ethyloctyl, n-undecyl, n-dodecyl, 8-methyldecyl, n-tridecyl, n-tetradecyl, n-pentadecyl, n-hexadecyl, n-heptadecyl, and n-octadecyl. Representative cycloalkyl groups are cyclopropyl, cyclobutyl, cyclopentyl, cyclohexyl, 2-methylcyclohexyl, cycloheptyl and cyclooctyl.

Representative alkenyl $R^2$ groups are vinyl, propenyl, 3-butenyl, 2butenyl, 4-pentenyl, 4-hexenyl, 5-hexenyl, 5-heptenyl, 3-heptenyl, 4-octenyl, 7-octenyl, 5-nonenyl, 4-nonenyl, 7-nonenyl, 9-decenyl, 6-decenyl, 11-dodecenyl, 8-undecenyl, 8-pentadecenyl, 8-heptadecenyl, 5-heptadecenyl, 10-heptadecenyl. Representative alkylnyl $R^2$ groups are propargyl, 3-butynyl, 5-hexynyl, 7-decynyl, 8-octadecynyl, etc.

The preferred $R^2$ groups have up to 11 carbon atoms. The most preferred $R^2$ groups are alkyl, particularly n-alkyl.

Representative N-alkanoylphosphoroamidothioates of formula (I) are: O-methyl-S-methyl-N-formylphosphoromidothioate, O-methyl-S-allyl-N-acetylphosphoroamidothioate, O-methyl-S-methyl-N-methyl-N-acetylphosphoramidothioate, O-allyl-S-allyl-N-propionylphosphoramidothioate, O-methyl-S-methyl-N-butyrylphosphoramidothioate, O-ethyl-S-hexyl-N-isobutyrylphosphoromidothioate, O-methyl-S-methyl-N-pentanoylphosphoroamidothioate, O-propargyl-S-propargyl-N-hexanoylphosphoroamidothioate, O-methyl-S-methyl-N-heptanoylphosphoroamidothioate, O-methyl-S-methyl-N-isopropyl-N-octanoylphosphoroamidothioate, O-methyl-S-pentyl-N-decanoylphosphoroamidothioate, O-methyl-S-methyl-N-dodecanoylphosphoramidothioate.

Representative N-cycloalkylcarbonylphosphoroamidothioates of formula (I) are: O-methyl-S-methyl-N-cyclopropylcarbonylphosphoroamidothioate, O-methyl-S-allyl-N-cyclohexylcarbonylphosphoroamidothioate, O-propargyl-S-propargyl-N-methyl-N-cyclooctylcarbonylphosphoroamidothioate, etc.

Representative N-alkenoylphosphoroamidothioates of formula (I) are: O-methyl-S-methyl-N-acrylylphosphoroamidothioate, O-methyl-S-methyl-N-3-butenoylphosphoroamidothioate, O-methyl-S-methyl-N-isobutenoylphosphoroamidothioate, O-allyl-S-allyl-N-methyl-N-3-pentenoylphosphoroamidothioate, O-propargyl-S-methyl-N-4-pentenoylphosphoroamidothioate, O-methyl-S-methyl-N-6-heptenoylphosphoroamidothioate, O-methyl-S-methyl-N-7- octenoylphosphoroamidothioate, O-methyl-S-methyl-N-11-dodecenoylphosphoroamidothioate, etc.

Representative N-alkylnoylphosphoramidothioates of formula (I) are: O-methyl-S-propyl-N-isopropyl-N-propynoylphosphoramidothioate, O-allyl-S-allyl-N-2-butylnoylphosphoramidothioate, O-propargyl-S-hexyl-N-9-decynoylphosphoroamidothioate, O-propyl-S-allyl-N-6-dodecynoylphosphoroamidothioate, etc.

Representative N-formylphosphoroamidothioates of formula (I) are: O-methyl-S-methyl-N-isopropyl-N-formylphosphoroamidothioate, O-allyl-S-allyl-N-formylphosphoroamidothioate, O-propargyl-S-methyl-N-formylphosphoroamidothioate, O-ethyl-S-ethyl-N-ethyl-N-formylphosphoroamidothioate, O-isopropyl-S-isopropyl-N-formylphosphoroamidothioate, O-allyl-S-propargyl-N-formylphosphoroamidothioate, etc.

Representative N-alkanoylphosphoroamidodithioates of formula (I) are: S-methyl-S-methyl-N-formylphosphoroamidodithioate, S-methyl-S-allyl-N-acetylphosphoroamidodithioate, S-methyl-S-methyl-N-methyl-N-acetylphosphoroamidodithioate, S-allyl-S-allyl-N-propionylphosphoroamidodithioate, S-methyl-S-methyl-N-butyrylphosphoroamidodithioate, S-ethyl-S-hexyl-N-isobutyrylphosphoroamidodithioate, S-methyl-S-methyl-N-pentanoylphosphoroamidodithioate, S-propargyl-S-propargyl-N-hexanoylphosphoroamidodithioate, S-methyl-S-methyl-N-heptanoylphosphoroamidodithioate, S-methyl-S-methyl-N-isopropyl-N-octanoylphosphoroamidodithioate, S-methyl-S-pentyl-N-decanoylphosphoroamidodithioate, S-methyl-S-methyl-N-dodecanoylphosphoroamidodithioate, etc.

Representative N-cycloalkylcarbonylphosphoroamidodithioates of formula (I) are: S-methyl-S-methyl-N-cyclopropylcarbonylphosphoroamidodithioate, S-methyl-S-allyl-N-cyclohexylcarbonylphosphoroamidodithioate, S-propargyl-S-propargyl-N-methyl-N-cyclooctylcarbonylphosphoroamidodithioate, etc.

Representative N-alkenoylphosphoroamidodithioates of formula (I) are: S-methyl-S-methyl-N-acrylylphosphoroamidodithioate, S-methyl-S-methyl-N-3-butenoylphosphoroamidodithioate, S-methyl-S-methyl-N-isobutenoylphosphoroamidodithioate, S-allyl-S-allyl-N-methyl-N-3-pentenoylphosphoroamidodithioate, S-propargyl-S-methyl-N-4-pentenoylphosphoroamidodithioate, S-methyl-S-methyl-N-6-heptenoylphosphoroamidodithioate, S-methyl-S-methyl-N-7-octenoylphosphoroamidodithioate, S-methyl-S-methyl-N-11-dodecenoylphosphoramidodithioate, etc.

Representative N-alkynoylphosphoroamidodithioates of formula (I) are: S-methyl-S-propyl-N-isopropyl-N-propynoylphosphoroamidodithioate, S-allyl-S-allyl-N-2-butynoylphosphoroamidodithioate, S-propargyl-S-hexyl-N-9-decynoylphosphoroamidodithioate, S-propyl-S-allyl-N-6-dodecynoylphosphoroamidodithioate, etc.

Representative N-formylphosphoroamidothioates of formula (I) are: S-methyl-S-methyl-N-isopropyl-N-formylphosphoroamidodithioate, S-allyl-S-allyl-N-formylphosphoroamidodithioate, S-propargyl-S-methyl-N-formylphosphoroamidodithioate, S-ethyl-S-ethyl-N-ethyl-N-formylphosphoroamidodithioate, S-isopropyl-S-isopropyl-N-formylphosphoroamidodithioate, S-allyl-S-propargyl-N-formylphosphoroamidodithioate, etc.

The preferred compounds of formula (I) are O,S-dialkyl-N-alkanoylphosphoroamidothioates wherein R and $R^1$ are alkyl of 1 to 3 carbon atoms, $R^2$ is lower n-alkyl of 1 to 6 carbon atoms, and $R^3$ is hydrogen.

The compounds of formula I may be prepared by acylating an appropriate O-hydrocarbyl-S-hydrocarbylphosphoramidothioate or S-hydrocarbyl-S-hydrocarbylphosphoroamidodithioate. O-alkyl-S-alkylphosphoroamidothioates and their preparation are disclosed in U.S. Pat. No. 3,309,266. O-alkyl-S-unsaturated hydrocarbyl phosphoroamidothioates and their preparation are disclosed in U.S. Pat. No. 3,649,723.

Conventional acylating agents, such as acyl halides, ketenes and acid anhydrides and conventional acylating conditions may be used in this reaction.

This acylation reaction (illustrated with an acyl halide as the acylating agent) may be represented by the following equation:

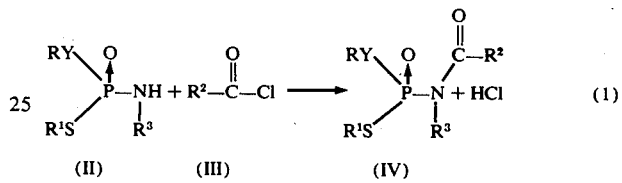

wherein R, $R^1$, $R^2$, $R^3$ and Y have the same significance as previously defined.

The acylation reaction (1) will usually be carried out at about 0° to 60°C. in the presence of solvents such as methylene chloride, chloroform, tetrahydrofuran and benzene. Pressure is not critical in this reaction. For convenience, atmospheric or autogenous pressure will be used. Under normal conditions, stoichiometric proportions or a slight deficiency of acylating agent will be used. The acylation will usually take 2 to 24 hours to reach completion. The reaction product may be purified by conventional extraction and recrystallization techniques.

N-acylated phosphoroamidothioates of this invention may also be prepared by acylating an appropriate O,O-dihydrocarbyl phosphoroamidothionate and then isomerizing the resulting N-acylphosphoroamidothionate with an alkylating agent to produce the O-hydrocarbyl-S-hydrocarbyl-N-acylphosphoroamidothioate. This reaction scheme is represented (using an acyl chloride as the acylating agent) by the following equations:

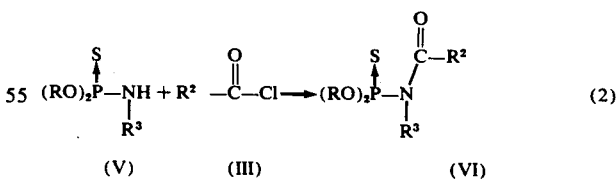

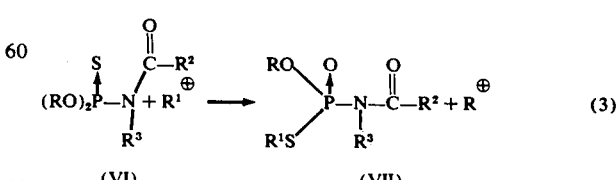

wherein $R^{1\oplus}$ represents an alkylating agent corresponding to $R^1$. This acylation may be carried out by the same techniques described above for the acylation reaction depicted in equation (1). The acylation reaction (2) is also described in applicant's U.S. Ser. No. 148,139, filed May 28, 1971. The reaction between the N-acylphosphoroamidothionate and the alkylating agent may be done according to the procedures described in U.S. Pat. No. 3,309,266 for reacting an O,O-dialkylphosphoroamidothionate with an alkylating agent.

Suitable alkylating agents represented by $R^{1+}$ include alkyl, alkenyl and alkynyl halides, particularly iodides,

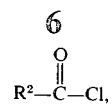

is weak it may be desirable to prepare the compounds of this invention by amidating an appropriate O,O-dihydrocarbylphosphorothiochloridate to obtain an O,-O-dihydrocarbyl-N-acylphosphoroamidothioate and reacting said N-acylphosphoroamidothioate with an alkylating agent as described above. This reaction scheme is illustrated by the following set of equations:

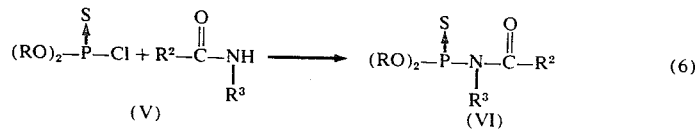

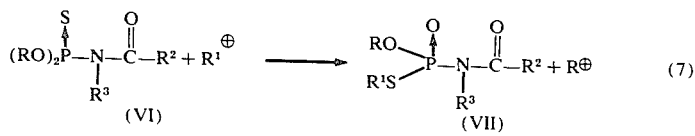

e.g., methyl iodide, ethyl iodide, allyl iodide, propargyl iodide, butyl iodide, etc. and dialkyl and dialkenyl sulfates, e.g., dimethyl sulfate, diethyl sulfate, diallyl sulfate and dihexyl sulfate.

Alternatively, the O,O-dihydrocarbyl-N-acylphosphoroamidothioate (VI) can be converted to the O,S-dihydrocarbylphosphoroamidothioate (VII) by treating the O,O-compound (VI) with a sodium alkyl mercaptide ($R^4SNa$) to form the S-sodium salt and alkylating the S-sodium salt to form the O,S-compound (VII). This reaction scheme is represented by the following equations:

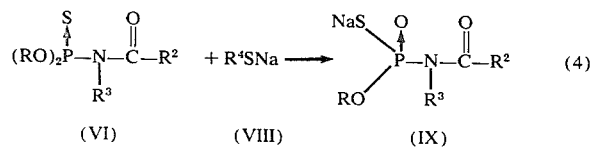

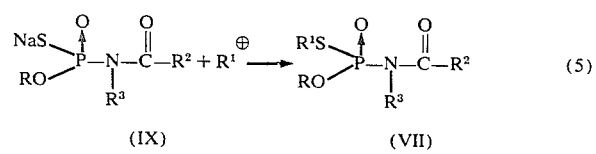

The metalation reaction depicted in equation (4) is conducted by contacting substantially equimolar amounts of the reactants (VI) and (VIII) in the liquid phase in an inert solvent at a temperature of 10°–100°C. The reaction is complete within 10 hours, more usually in 5 hours or less. The sodium salt product (IX) may be used for further reaction without separation. The alkylation of the sodium salt (IX) is effected by mixing substantially equimolar amounts of the sodium salt (IX) and the alkylating agent $R^{1\oplus}$ in an inert solvent at a temperature in the range of 0°–80°C, preferably 25°–60°C. The product (VII) is isolated by conventional methods, e.g., extraction, chromatography, etc.

If the acylating agent, e.g.,

The S-hydrocarbyl-S-hydrocarbylphosphoroamidodithioate can be prepared by the reaction of phosphorous oxychloride with a mercaptan followed by amidation of the resulting S-hydrocarbyl-S-hydrocarbylphosphoroamidodithioate. The first step of the synthesis involves the addition of 2 mols of a mercaptan to 1 mol of phosphorus oxychloride ($POCl_3$) according to the following equations (if R and $R^1$ are the same, a single reaction can be carried out):

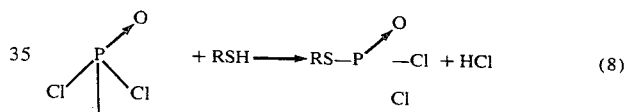

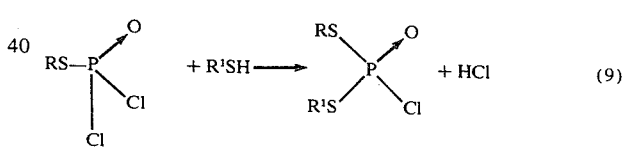

The above reactions are preferably carried out in the presence of a weak base, such as the organic amines, for example pyridine, dimethyl aniline, triethyl amine, etc. The base is preferably present in an amount of least equal to the moles of mercaptan. An inert organic solvent, such as diethyl ether, tetrahydrofuran, dioxane, dichloromethane, etc. may be present. The reaction temperatures are generally in the range of 0° to 15°C., preferably 0° to 5°C. The reaction time necessary to complete the addition of the mercaptan to the phosphorous oxychloride will range from about 1 to 10 hours. The S-hydrocarbyl-S-hydrocarbylphosphorochloroidodithioate product can be purified by distillation, crystallization or chromatography, if desired.

The second step of the preparation, i.e., amidation, is carried out by reacting gaseous ammonia or an amine with the S-hydrocarbyl-S-hydrocarbylphosphorochloridodithioate according to the following equation:

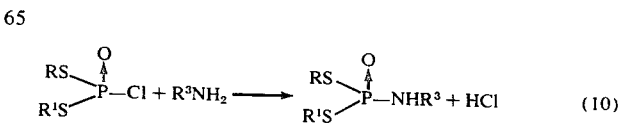

wherein R, R¹ and R³ have the same significance as previously defined.

The reaction is preferably carried out in an inert organic solvent, such as benzene, toluene, xylene, and the like, at temperatures in the range of 10° to 75°C, preferably 40° to 60°C. Completion of the reaction is indicated by cessation of ammonium chloride amine hydrochloride precipitation. Following the reaction, the crude product can be isolated by conventional techniques such as filtration, extraction, distillation, chromatography, etc.

The O,O-dihydrocarbylphosphoroamidothioate compounds used to prepare the compounds of the invention are prepared by the following reactions:

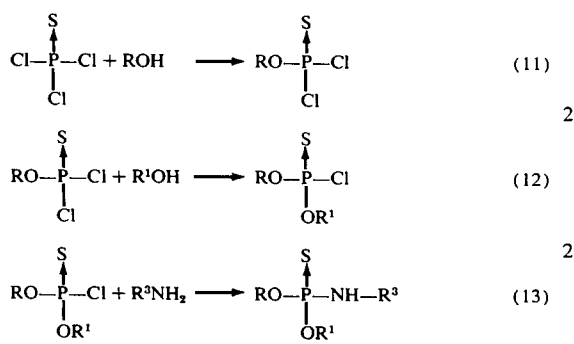

The above reactions (11–13) are conducted by essentially the same procedures described for reactions (8–10).

EXAMPLES

The following examples describe methods which may be used to prepare the phosphoroamidothioates and phosphoroamidodithioates of this invention. Representative compounds prepared by these methods are tabulated in Table I.

EXAMPLE 1

14.1 g. (0.1 mole) of O-methyl-S-methylphosphoroamidothioate was dissolved in 100 ml. benzene in a flask. 7.85 g. (0.1 mole) acetylchloride was added to this solution. This mixture was brought to reflux — HCl being evolved at that point. This mixture was then stirred overnight at ambient temperature. Supernatant liquid was decanted and the solvent was stripped off at 30°–40°C., 12 mm. Hg. An oil remained which solidified on standing. This solid was filtered and washed with ether to yield 7 g. of impure O-methyl-S-methyl-N-acetylphosphoroamidothioate. This material melted at 64–68°C. and had the following analysis:

|  | Calculated | Found |
|---|---|---|
| % P | 16.93 | 18.28 |
| % S | 17.48 | 18.05 |

EXAMPLE 2

176 g. (1.25 moles) of O-methyl-S-methyl phosphoroamidothionate was dissolved in 300 ml. of dichloromethane and charged to a 1 liter flask. 98 g. (1.25 moles) of acetylchloride dissolved in 100 ml. of dichloromethane was added. The solution was stirred, warmed to 33°C, held at that temperature for 4 hours, then an additional 98 g. (1.25 moles) of acetylchloride was added. The mixture was held at room temperature for 18 hours and then added to 500 ml. of ice water. The phases were separated and the aqueous phase was extracted with four 200 ml. portions of dichloromethane. The extracts were combined with the separated organic phase and the solvent removed by gentle heating under vacuum to give 50 g. of product. The aqueous phase after batch extraction was further extracted continuously for 18 hours in a liquid-liquid extraction apparatus using 2 liters of dichloromethane as the extractant. Evaporation of the dichloromethane gave an additional 110 g. of product, giving a total yield of 87%. Upon purification, the product, O-methyl-S-methyl-N-acetylphosphoroamidothioate, gave the following analysis:

|  | Calculated | Found |
|---|---|---|
| % N | 7.65 | 7.28 |
| % S | 17.48 | 17.88 |

EXAMPLE 3

6 g. of O,O-diethyl-N-acetylphosphoroamidothionate was mixed with 10 ml. ethyl iodide in a flask. This mixture was refluxed for 30 hours. The resulting reaction mixture was stripped at 80°C., 30 mm. Hg, leaving 4.5 g. oil which crystallized on standing. This material, O-ethyl-S-ethyl-N-acetylphosphoroamidothioate, had the following analysis:

|  | Calculated | Found |
|---|---|---|
| % P | 14.68 | 14.02 |
| % S | 15.19 | 15.15 |

EXAMPLE 4

30 g. of O,O-dimethylphosphoroamidothioate and 41 g. of n-decanoyl chloride were dissolved in 120 ml. of methylene chloride and refluxed for 2 hours. After treatment with water to remove acidic by-products, the solution was dried over magnesium sulfate and stripped to give 60.4 g. of O,O-dimethyl-N-decanoyl phosphoroamidothioate (96% yield).

20 g. of the above O,O-dimethyl-N-decanoyl phosphoroamidothioate was then mixed with 4 g. dimethyl sulfate and held at 60°C for 1 hour. O-methyl-S-methyl-N-decanoyl phosphoroamidothioate was recovered by chromatographic means giving a yield of 9.5 g. This material had the following analysis:

|  | Calculated | Found |
|---|---|---|
| % P | 10.50 | 10.67 |
| % S | 10.85 | 10.47 |

EXAMPLE 5

S,S-dimethyl-N-acetylphosphoroamidodithioate was prepared as follows.

A solution of 73.2 g. (0.48 mole) of phosphorous oxychloride in 300 ml. of dry diethyl ether was charged to a 1 liter flask at a temperature of 0°C. A solution of 76.2 g. (0.96 mole) of pyridine and 49 g. (1.0 mole) of methyl mercaptan in 400 ml. of diethyl ether was added slowly to the flask containing phosphorous oxychloride over a 2-hour period of time, maintaining the temperature from 0°C to 5°C. The mixture was then stirred for an additional 6 hours at temperatures of 0° to 10°C.

After 18 hours of standing at 0°C the crude reaction product was separated from the solid residue, stripped of solvent and purified to give 31.7 g. of a liquid S,S-dimethylphosphorochloridodithioate.

The above S,S-dimethylphosphorochloridodithoate was then charged with 500 ml. of toluene to a 1 liter flask and ammonia gas added slowly at a temperature of 50° to 55°C. When the temperature started to drop, ammonia addition was stopped. The reaction was held at 50°C for ½ hour and then cooled to room temperature and filtered. The filtrate was stripped of solvent under vacuum, then purified to give 6.6 g. of S,S-dimethylphosphoroamidodithioate. The compound had a melting point of 103°–105°C and the following N, S, P analysis:

|  | Calculated | Found |
|---|---|---|
| % N | 8.9 | 9.65 |
| % S | 41.0 | 38.1 |
| % P | 19.7 | 19.2 |

S,S-dimethylphosphoroamidodithioate was dissolved in 250 ml. dichloromethane and charged to a 500 ml. flask. 39.3 g. (0.5 mole) of acetylchloride was added. The solution was refluxed for 2 hours and stored at room temperature for 18 hours. The dichloromethane and excess acetylchloride were removed by evaporation and the product dissolved in 250 ml. of dichloromethane to which was added 250 ml. water containing sufficient calcium hydroxide to give a pH of 7 after thorough mixing. The organic phase was separated from the aqueous phase and the S,S-dimethyl-N-acetylphosphoroamidodithioate recovered from the organic phase as an oil (3.7 g.). Analysis was as follows:

|  | Calculated | Found |
|---|---|---|
| % N | 7.03 | 6.48 |
| % S | 32.1 | 31.05 |
| % P | 15.52 | 14.08 |

EXAMPLE 6

Preparation of
O-allyl-S-methyl-N-acetylphosphoroamidothioate.

A 68 g (1.1 mol) sample of allyl alcohol was added dropwise to 84 g (0.5 mol) phosphorous thiochloride (PSCl$_3$) at 0°–10°C. The resulting reaction mixture was cooled in a DRY-ICE/acetone bath while 80 g (1 mol) of a 50% sodium hydroxide solution was added. After the addition was completed, the reaction mixture was stirred at about 25°C for 1½ hours, diluted with 200 ml water and 50 ml chloroform. The organic phase was separated, dried over magnesium sulfate, filtered and evaporated under reduced pressure. The residue was distilled to 31.3 g of O,O-diallylphosphorochloridothioate, b.p. 72°–74°C (0.15 mm Hg).

The above O,O-diallylphosphorochloridothioate (30 g) and 500 ml benzene were then charged to a flask and ammonia (10 g) in 100 ml benzene was slowly added. A heavy precipitate was formed in an exothermic reaction. The reaction was evaporated to give a cloudy white liquid. The liquid was diluted with 50 ml methylene chloride and refluxed with 10 g of ammonium hydroxide for ½ hour. The organic layer was washed with water, dried over magnesium sulfate, filtered and evaporated to give 20 g of O,O-diallylphosphoroamidothioate.

A 10 g (0.0518 mol) sample of the above O,O-diallylphosphoroamidothioate, 6 g (0.059 mol) acetic anhydride, 40 ml methylene chloride and 1 ml phosphoric acid was refluxed for 3 hours. The reaction mixture was diluted with 50 ml water and 100 ml aqueous saturated ammonium chloride solution. The aqueous solution was extracted with methylene chloride. The methylene chloride extracts were washed with aqueous ammonium chloride solution, dried over magnesium sulfate and evaporated to give 10.4 g of O,O-diallyl-N-acetylphosphoroamidothioate.

A mixture of 10 g (0.0425 mol) of the above O,O-diallyl-N-acetylphosphoroamidothioate, 4.3 g (0.0425 mol) sodium n-butyl mercaptide and 40 ml methanol was refluxed for 4 hours and then evaporated under reduced pressure to give the crude S-sodium-O-allyl-N-acetylphosphoroamidothioate salt. The salt, 6 g dimethyl sulfate and 40 ml acetonitrile, were then refluxed for 25 hours. A heavy precipitate formed. The reaction mixture was filtered and the filtrate was evaporated under reduced pressure to give 9 g of a yellow liquid residue. The residue was chromatographed on silica (hexane/methylene chloride/acetone eluants) to give the S-methyl-O-allyl-N-acetylphosphoroamidothioate product as an oil. Elemental analysis for C$_6$H$_{12}$NO$_3$PS showed:

|  | Calculated | Found |
|---|---|---|
| % wt. P | 14.8 | 14.62 |
| % wt. S | 15.4 | 15.8 |

EXAMPLE 7

Preparation of
O,S-dimethyl-N-formylphosphoroamidothioate.

A 10 ml. sample of 98% formic acid was added slowly to 20 ml. of acetic anhydride at 0°C. To the resulting formic acetic anhydride containing solution was added 21.2 g. (0.15 mole) O,O-dimethylphosphoroamidothioate, 30 ml. methylene dichloride and 0.5 ml. phosphoric acid. The resulting reaction mixture was stirred at about 25°C for 23 hours, then mixed with 15 g. ice and 30 ml. saturated ammonium chloride solution. The aqueous mixture was neutralized with 15% ammonium hydroxide solution. The aqueous phase was extracted with methylene chloride. The methylene chloride extract and the organic phase were combined, washed with saturated ammonium chloride solution, dried over magnesium sulfate and evaporated under reduced pressure to give 25 g. of O,O-dimethyl-N-formylphosphoroamidothioate product. The nuclear magnetic resonance spectrum showed that the product contained about 5% O,O-dimethyl-N-acetylphosphoroamidothioate. Analysis for C$_3$H$_8$NO$_3$PS showed:

|  | Calculated | Found |
|---|---|---|
| % N | 8.28 | 7.83 |
| % P | 18.32 | 17.08 |

A 13 g. sample of O,O-dimethyl-N-formylphosphoroamidothioate and 2.5 g. dimethyl sulfate were heated at 70°–80°C for 6 hours. The crude reaction mixture was chromatographed on silica gel (methylene chloride/acetone eluants) to give the O,S-dimethyl-N- formylphosphoroamidothioate product as an oil. Analysis on the product is tabulated in Table I.

EXAMPLE 8

Preparation of S-sodium-O-methyl-N-hexanoylphosphoroamidothioate.

O,O-dimethyl-N-hexanoylphosphoroamidothioate, 69 g (0.28 mol), was dissolved in 100 ml methanol. To this solution was added 23 g (0.29 mol) of 50% aqueous sodium hydroxide. The resulting solution was stirred for 10 minutes, then 26.3 g (0.29 mol) of n-propyl mercaptan was added. This mixture was refluxed for 4 hours, and then held at 25°C for about 17 hours. The precipitated solid was removed by filtration, washed with methylene dichloride and then dried under vacuum to give 38 g of product, m.p. 105°–108°C. Elemental analysis showed:

|      | Calc. | Found |
|------|-------|-------|
| % S  | 17.2  | 16.5  |
| % P  | 18.6  | 16.2  |

EXAMPLE 9

Preparation of S-allyl-O-methyl-N-hexanoylphosphoroamidothioate.

A mixture of 7 g. S-sodium-O-methyl-N-hexanoylphosphoroamidothioate (prepared as described in Example 8) and 30 g. allyl bromide was refluxed for 3.5 hours and allowed to stand at about 25°C for about 16 hours. The solids in the reaction mixture were filtered and washed with methylene dichloride. The filtrate and methylene dichloride washes were evaporated under reduced pressure to give the product as a viscous oil. Elemental analysis on the product is tabulated in Table I.

EXAMPLE 10

Preparation of S-propargyl-O-N-hexanoylphosphoroamidothioate.

A mixture of 7 g. S-sodium-O-methyl-N-hexanoylphosphoroamidothioate (prepared as described in Example 8) and 30 g. propargyl bromide was refluxed for 3 hours and then allowed to stand at about 25°C for about 17 hours. The reaction mixture was diluted with methylene dichloride and filtered. The filtrate was evaporated under reduced pressure and the residue was dissolved in benzene and filtered. Hexane was then added to benzene solution to precipitate 5.7 g. of the product, m.p. 63°–65°C. Elemental analysis on the product is tabulated in Table I.

EXAMPLE 11

Preparation of O,S-dimethyl-N-octadecanoylphosphoroamidothioate.

A mixture of 7.8 g. O,O-dimethyl-N-octadecanoylphosphoroamidothioate, 1.8 g. dimethyl sulfate and 20 ml. chloroform was refluxed for 3 hours. The reaction mixture was cooled and then filtered. The filtrate was evaporated under reduced pressure to give a solid. The solid was recrystallized from methylene dichloride to give the product as fine white crystals. m.p. 57°–62°C. Elemental analysis on the product is tabulated in Table I.

EXAMPLE 12

Preparation of O,S-Dimethyl-N-isovaleroylphosphoroamidothioate.

A mixture of 35 g. O,S-dimethylphosphoroamidothioate, 21.7 g. isovaleroyl chloride, 80 ml. methylene dichloride and 8 g. magnesium sulfate was refluxed for 2 hours. Large amounts of hydrochloric acid were evolved. The reaction mixture was diluted with 200 ml. water and neutralized with aqueous sodium carbonate solution. The aqueous phase was separated and extracted with methylene dichloride. The organic layers were combined, washed with water, dried over magnesium sulfate, and filtered. The crude product separated out as a viscous oil. The oil was crystallized from methylene dichloride/hexane to give the product, m.p. 75°–78°C. Elemental analysis on the product is tabulated in Table I.

EXAMPLE 13

Preparation of O,S-Dimethyl-N-Undecynoylphosphoroamidothioate.

A mixture of 20.9 g. (0.685 mole) O,O-dimethyl-N-undecynoylphosphoroamidothioate (prepared by acylating O,O-dimethylphosphoroamidothioate with undecynoyl chloride) and 7 g. (0.055 mole) dimethyl sulfate was heated for 2 hours at 70°–75°C. The crude reaction mixture was chromatographed on silica gel (hexane/methylene chloride/acetone eluants) to give the product, m.p. 34°–40°C. Elemental analysis on the product is tabulated in Table I.

EXAMPLE 14

Preparation of O,S-Dimethyl-N-Cyclohexylcarbonylphosphoroamidothioate.

The product was prepared by acylating 14.1 g. (0.1 mole) O,S-dimethylphosphoroamidothioate with 14.7 g. (0.1 mole) cyclohexanecarboxylic acid chloride in methylene dichloride by a procedure similar to those heretofore described. Elemental analysis on the product is tabulated in Table I.

TABLE I

Compounds of the formula

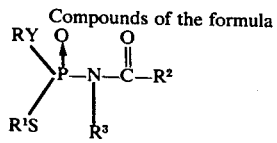

| No. | Y | R | R¹ | R³ | R² | Melting Point °C. | % P Calc. | % P Found | % S Calc. | % S Found |
|-----|---|---|----|----|----|-------------------|-----------|-----------|-----------|-----------|
| 1 | O | $CH_3$ | $CH_3$ | H | H | Oil | 18.32 | 19.47 | — | — |
| 2 | O | $CH_3$ | $CH_3$ | H | $CH_3$ | 64–68 | 16.93 | 18.28 | 17.48 | 18.05 |
| 3 | O | $C_2H_5$ | $CH_3$ | H | $CH_3$ | 67–75 | 15.70 | 15.35 | 16.24 | 16.95 |
| 4 | O | $CH_3$ | $CH_3$ | H | $C_2H_5$ | Oil | 15.65 | 14.62 | 16.25 | 16.22 |

TABLE I—Continued

Compounds of the formula $$\begin{array}{c} RYO \quad O \\ \phantom{RY}\searrow\uparrow \quad \parallel \\ \phantom{RYO}P-N-C-R^2 \\ \phantom{RY}\nearrow \quad | \\ R^1S \quad R^3 \end{array}$$

| No. | Y | R | R¹ | R³ | R² | Melting Point °C. | % P Calc. | % P Found | % S Calc. | % S Found |
|---|---|---|---|---|---|---|---|---|---|---|
| 5 | O | CH₃ | CH₃ | H | CH₃(CH₂)₂ | Oil | 13.42 | 14.68 | 14.79 | 15.18 |
| 6 | O | CH₃ | CH₃ | H | (CH₃)₂CH | Oil | 14.68 | 12.10 | 15.18 | 13.65 |
| 7 | O | CH₃ | CH₃ | H | n—C₅H₁₁ | Oil | 12.95 | 12.48 | 13.42 | 11.88 |
| 8 | O | CH₃ | CH₃ | H | t—C₄H₉ | Oil | 13.76 | 11.90 | 14.25 | 13.68 |
| 9 | O | CH₃ | CH₃ | H | n—C₉H₁₉ | Oil | 10.50 | 10.67 | 10.85 | 10.47 |
| 10 | O | C₂H₅ | C₂H₅ | H | CH₃ | 179–183 | 14.68 | 14.02 | 15.19 | 15.15 |
| 11 | S | CH₃ | CH₃ | H | CH₃ | Oil | 15.52 | 14.08 | 32.1 | 31.05 |
| 12 | O | C₂H₅ | CH = CCH₂ | H | CH₃ | Oil | 14.05 | 13.81 | 14.85 | 15.58 |
| 13 | O | CH₃ | CH₂=CHCH₂ | H | C₂H₅ | — | — | — | 14.38 | 14.05 |
| 14 | O | CH₃ | CH = CCH₂ | H | C₂H₅ | — | — | — | 14.50 | 14.22 |
| 15 | O | CH₃ | CH₂=CHCH₂ | H | n—C₅H₁₁ | Oil | 11.68 | 11.13 | 12.09 | 12.10 |
| 16 | O | CH₃ | CH = CCH₂ | H | n—C₅H₁₁ | 63–65 | 11.77 | 11.60 | 12.18 | 11.82 |
| 17 | O | CH₃ | CH₃ | CH₃ | CH₃ | Oil | 15.70 | 13.50 | 16.27 | 14.80 |
| 18 | O | CH₃ | CH₂=CHCH₂ | H | sec—C₄H₉ | Oil | 12.33 | 12.15 | 12.76 | 12.1 |
| 19 | O | CH₃ | CH = CCH₂ | H | sec—C₄H₉ | 83–85 | 12.43 | 12.5 | 12.87 | 12.99 |
| 20 | O | CH₃ | CH₃ | H | n—C₁₀H₂₁ | 58–61 | 10.0 | 9.84 | — | — |
| 21 | O | CH₃ | CH₃ | H | n—C₁₂H₂₅ | 55–61 | 9.6 | 9.13 | — | — |
| 22 | O | CH₃ | CH₃ | H | n—C₁₇H₃₅ | 51–62 | 7.6 | 6.7 | 7.85 | 7.85 |
| 23 | O | CH₃ | CH₃ | H | sec—C₄H₉ | Oil | 13.75 | 13.57 | 14.2 | 15.30 |
| 24 | O | CH₃ | CH₃ | H | n—C₇H₁₅ | Oil | 11.5 | 10.47 | 11.99 | 10.82 |
| 25 | O | CH₃ | CH₃ | H | n—C₁₁H₂₃ | 49–50 | 9.58 | 9.57 | 9.92 | 9.97 |
| 26 | O | CH₃ | CH₃ | H | n—C₁₃H₂₇ | 59–61 | 8.8 | 8.15 | 9.12 | 9.00 |
| 27 | O | CH₃ | CH₃ | CH₃ | n—C₅H₁₁ | Oil | 12.24 | 11.22 | 12.67 | 10.70 |
| 28 | O | CH₃ | CH₃ | H | sec—C₅H₁₁ | Oil | 12.10 | 12.95 | 13.09 | 13.42 |
| 29 | O | CH₃ | CH₃ | H | CH₃CH=CHCH₂ | Oil | — | — | 15.32 | 13.82 |
| 30 | O | CH₃ | CH₃ | H | CH₂=CH | Oil | 15.99 | 15.85 | 16.42 | 18.20 |
| 31 | O | CH₃ | CH₃ | H | n—oleoyl | Oil | 7.64 | 6.87 | 7.90 | 8.27 |
| 32 | O | CH₃ | CH₃ | H | (CH₃)₂C=CH | 75–78 | 13.85 | 13.38 | 14.33 | 14.62 |
| 33 | O | CH₃ | CH₃ | H | CH₂=CH(CH₂)₈ | Oil | 10.07 | 7.85 | 10.42 | 9.23 |
| 34 | O | CH₃ | CH₃ | H | CH = C(CH₂)₈ | 34–40 | 10.14 | 7.14 | 10.5 | 11.93 |
| 35 | O | CH₃ | CH₃ | H | ⬡ | 95–100 | 12.33 | 12.18 | 12.76 | 13.40 |
| 36 | O | CH₃ | CH₃ | H | △ | Oil | 14.8 | 13.75 | 15.3 | 14.82 |
| 37 | O | CH₂=CHCH₂ | CH₃ | H | CH₃ | Oil | 14.8 | 14.6 | 15.4 | 15.8 |

UTILITY

The compounds of this invention were tested as follows to illustrate their insecticidal activity. Test results are reported in Table II.

TEST PROCEDURES

Cabbage Looper (*Trichoplusia ni*)

An acetone solution of the candidate toxicant containing a small amount of nonionic emulsifier was diluted with water to 500 ppm. Cabbage leaf sections were dipped in the toxicant solution and dried. The sections were then infested with cabbage looper larvae. Mortality readings were taken after 24 hours.

American Cockroach (*Periplaneta americana L.*)

A 500 ppm acetone solution of the candidate toxicant was placed in a microsprayer (atomizer). A random mixture of anesthetized male and female roachs was placed in a container and 55 mg. of the above-described acetone solution was sprayed on them. A lid was placed on the container. A mortality reading was made after 24 hours.

Houseflies (*Musca domestica L.*)

A 500 ppm acetone solution of the candidate toxicant was placed in a microsprayer (atomizer). A random mixture of anesthetized male and female flies were placed in a container and 55 mg. of the above-described acetone solution was sprayed on them. A lid was placed on the container. A mortality reading was made after 24 hours.

Two-spotted Mites (*Tetramuchus urticae*)

An acetone solution of the candidate toxicant containing a small amount of nonionic emulsifier was diluted with water to 100 ppm. Pinto bean leaves which were infested with mites were dipped in the toxicant solution. Mortality readings were taken after 24 hours.

Aphids (*Aphis gossypii Glover*)

An acetone solution of the candidate toxicant containing a small amount of nonionic emulsifier was diluted with water to 30 ppm. Cucumber leaves infested with the cotton aphids were dipped in the toxicant solution. Mortality readings were then taken after 24 hours.

TABLE II

| | % MORTALITY | | | | |
|---|---|---|---|---|---|
| No. | CABBAGE LOOPER (500 ppm) | AMERICAN COCKROACH (500 ppm) | HOUSEFLY (500 ppm) | MITE (100 ppm) | APHID (30 ppm) |
| 1 | 70 | 100 (250 ppm) | 100 (100 ppm) | 76 (40 ppm) | 68 (10 ppm) |
| 2 | 100 (250 ppm) | 100 (100 ppm)* | 100 (250 ppm) | 81 (10 ppm) | 78 |

TABLE II—Continued

| | % MORTALITY | | | | |
|---|---|---|---|---|---|
| No. | CABBAGE LOOPER (500 ppm) | AMERICAN COCKROACH (500 ppm) | HOUSEFLY (500 ppm) | MITE (100 ppm) | APHID (30 ppm) |
| 3 | 90 (250 ppm) | 100 (100 ppm)* | 100 (250 ppm) | 22 | 0 |
| 4 | 90 | 100 (100 ppm)* | 100 (100 ppm) | 100 | 100 |
| 5 | 39 | 100 | 100 | 100 | 39 |
| 6 | 0 | 15 | 100 | 85 | 78 |
| 7 | 100 | 100 | 100 | 99 | 85 |
| 8 | 0 | 0 | 60 | 70 | 90 |
| 9 | 100 | 100 | 100 | 100 | 100 |
| 10 | 10 (250 ppm) | 26 (250 ppm)* | 50 | 39 | |
| 11 | 10 (675 ppm) | 25 | 100 | 97 | 98 |
| 12 | | | 93 (125 ppm) | 30 | |
| 13 | 50 | 78 | 100 | 94 | 60 |
| 14 | 100 | 100 | 100 | 90 | 78 |
| 15 | 88 | 22 | 0 | 22 | 78 |
| 16 | 100 | 100 | 100 | 30 | 50 |
| 17 | 0 | 39 | 0 | 0 | 0 |
| 18 | 0 | 22 | 39 | 98 (30 ppm) | 39 |
| 19 | 0 | 60 | 100 | 100 (30 ppm) | 22 |
| 20 | 80 | 60 | 100 | 100 | 94 |
| 21 | 94 | 39 | 20 (100 ppm) | 100 | 99 |
| 22 | 10 | 2 | 73 | 92 | 100 |
| 23 | 20 | 60 | 70 | 99 | 90 |
| 24 | 90 | 100 | 99 | 100 | 70 |
| 25 | 100 | 39 | 100 | 100 (16 ppm) | 0 |
| 26 | 100 | 100 | 100 | 100 | 78 |
| 27 | 0 | 0 | 0 | 96 (200 ppm) | 0 |
| 28 | 50 (625 ppm) | 0 | 10 | 70 | 15 |
| 29 | 22 | 0 | 90 | 99 | 10 |
| 30 | 98 | 100 | 100 | 99 | 85 |
| 31 | 70 (625 ppm) | 94 | 100 | 100 | 70 |
| 32 | 10 | 0 | 0 | 0 | 0 |
| 33 | 55 | 94 | 100 | 99 | 78 |
| 34 | 70 | 100 | 100 | 100 | 0 |
| 35 | 39 | 0 | 0 | 60 | 39 |
| 36 | 0 | 0 | 100 | 99 | 70 |
| 37 | 90 | 100 | 100 | 85 (40 ppm) | 90 |

*German Cockroaches

In tests carried out in the field, O-methyl-S-methyl-N-acetylphosphoroamidothioate showed excellent activity against the following insects:

| Insect | Crop |
|---|---|
| Pea aphid | alfalfa |
| Western yellow striped armyworm | alfalfa |
| Beet armyworm | alfalfa |
| Lygus hesperus | alfalfa |
| Citrus snow scale | citrus (grapefruit) |
| Diamondback larvae | collards |
| Bollworm | cotton |
| Beet armyworm | cotton |
| Green peach aphid | potatoes |
| Beet armyworm | sorghum |
| Beet armyworm | soybean |
| Corn earworm | corn |

As previously indicated the toxicological properties of the compounds of this invention are unexpectedly better than corresponding non-acylated compounds. This feature may be illustrated by comparing the toxicity index of a representative compound of this invention with that of its corresponding non-acylated analog. Toxicity index is a measure of a compound's safety relative to its insecticidal activity. It is defined here as:

$$\frac{LD_{90} \text{ insects (ppm)}}{LD_{50} \text{ rats-oral (mg/kg.)}}$$

"$LD_{90}$ insects" is the least dosage that will provide 90% mortality of the test insect. It is determined by testing the toxicants at various concentrations by the above-described testing and plotting the results. "$LD_{50}$ rats-oral" is the lowest dosage that will kill 50% of the test rodents in standard oral application tests. The toxicity indexes of O-methyl-S-methyl-N-acetylphosphoroamidothioate and its non-acylated analog O-methyl-S-methylphosphoroamidothioate, determined as above, are reported in Table III below. Also reported are the toxicity indexes of other O-methyl-S-methyl-N-acylphosphoroamidothioates.

TABLE III

| Compound | $LD_{50}$ Rats Oral (mg/kg) | $LD_{90}$ Cabbage Looper (ppm) | $LD_{90}$ German Roaches (ppm) | $LD_{90}$ Flies (ppm) | $LD_{90}$ Mites (ppm) | $LD_{90}$ Cotton Aphids (ppm) | Toxicity Index X $10^2$ | | | | |
|---|---|---|---|---|---|---|---|---|---|---|---|
| | | | | | | | Cabbage Looper | German Roaches | Flies | Mites | Aphids |
| O-methyl-S-methyl-N-acetylphosphoroamidothioate | 700 | 100 | 20.5 | 21.5 | | | 14.3 | 2.9 | 3.1 | | |
| O-methyl-S-methyl-N-propionyl phosphoroamidothioate | >1000 | 180 | 85 | 27 | | | <18 | <8.5 | <2.7 | | |

TABLE III – Continued

| Compound | LD$_{50}$ Rats Oral (mg/kg) | LD$_{90}$ Cabbage Looper (ppm) | LD$_{90}$ German Roaches (ppm) | LD$_{90}$ Flies (ppm) | LD$_{90}$ Mites (ppm) | LD$_{90}$ Cotton Aphids (ppm) | Toxicity Index X 10$^2$ Cabbage Looper | German Roaches | Flies | Mites | Aphids |
|---|---|---|---|---|---|---|---|---|---|---|---|
| O-methyl-S-methyl-N-butyrylphosphoro-amidothioate | 125 | | | 24.5 | | | | | 19.6 | | |
| O-methyl-S-methyl-N-isobutyryl-phosphoroamidothioate | >500 | | | | 14.5 | 5.4 | | | | <2.9 | <1.1 |
| O-methyl-S-methyl-phosphoroamido-thioate | 16 | 92 | 15.2 | ~10 | 9.5 | 7.5 | 575 | 95 | 62.5 | 59.3 | 47 |

The compounds of this invention are toxic to a variety of crop and household pests, in addition to the typical pests exemplified above. Like most agricultural chemicals, they are not usually applied full strength, but are generally incorporated with conventional biologically inert extenders or carriers normally employed for facilitating dispersion of active ingredients for agricultural chemical applications, recognizing the accepted fact that the formulation and mode of application may affect the activity of a material. The toxicants of this invention may be applied as sprays, dusts, or granules to the insects, their habitat or hosts susceptible to insert attack. They may be formulated as granules of large particle size, as powdery dusts, as wettable powders, as emulsifiable concentrates, as solutions, or as any of several other known types of formulations, depending on the desired mode of application.

Wettable powders are in the form of finely divided particles which disperse readily in water or other dispersant. These compositions normally contain from 5–80% toxicant and the rest inert material which includes dispersing agents, emulsifying agents, and wetting agents. The powder may be applied to the soil as a dry dust or preferably as a suspension in water. Typical carriers include fuller's earth, kaolin clays, silicas, and other highly absorbent, readily wet, inorganic diluents. Typical wetting, dispersing, or emulsifying agents used in agricultural formulations include, for example, the alkyl and alkylaryl sulfonates and sulfonates and their sodium salts; alkylamide sulfonates, including fatty methyl taurides; alkylaryl polyether alcohols, sulfated higher alcohols, and polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface active agents are available in commerce. The surface active agent, when used, normally comprises from one percent to fifteen percent by weight of the pesticidal composition.

Dusts are freely flowing admixtures of the active ingredient with finely divided solids such as talc, natural clays, kieselguhr, pyrophyllite, chalk, diatomaceous earths, calcium phosphates, calcium and magnesium carbonates, sulfur, lime, flours, and other organic and inorganic solids which act as dispersants and carriers for the toxicant. These finely divided solids have an average particle size of less than about fifty microns. A typical dust formulation useful herein contains 75% silica and 25% of the toxicant.

Useful liquid concentrates include the emulsifiable concentrates, which are homogeneous liquid or paste compositions which are readily dispersed in water or other dispersant, and may consist entirely of the toxicant with a liquid or solid emulsifying agent, or may also contain a liquid carrier, such as xylene, heavy aromatic naphthas, isophorone, and other non-volatile organic solvents. For application these concentrates are dispersed in water or other liquid carrier, and normally applied as a spray to the area to be treated.

Other useful formulations for insecticidal applications include simple solutions of the active ingredient in a dispersant in which it is completely soluble at the desired concentration, such as acetone, alkylated naphthalenes, xylene, or other organic solvents. Granular formulations, wherein the toxicant is carried on relatively coarse particles, are of particular utility for aerial distribution or for penetration of cover crop canopy. Baits, prepared by mixing solid or liquid concentrates of the toxicant with a suitable food, such as a mixture of cornmeal and sugar, are useful formulations for control of insect pests. Pressurized sprays, typically aerosols wherein the active ingredient is dispersed in finely divided form as a result of vaporization of a low-boiling dispersant solvent carrier, such as the Freons, may also be used. All of these techniques for formulating and applying the active ingredient are well known in the art.

The percentages by weight of the toxicant may vary according to the manner in which the composition is to be applied and the particular type of formulation, but in general comprises 0.5 to 95% of the toxicant by weight of the pesticidal composition.

The pesticidal compositions may be formulated and applied with other active ingredients, including other nematocides, insecticides, fungicides, bactericides, plant growth regulators, fertilizers, etc. In applying the chemical an effective amount and concentration of the toxicants of this invention is, of course, employed.

The term "insecticide" and "insect" as used herein refer to their broad and commonly understood usage rather than to those creatures which in the strict biological sense are classified as insects. Thus, the term "insect" is used not only to include small invertebrate animals belonging to the class Insecta, but also to other related classes of arthropods whose members are segmented invertebrates having more or fewer than six legs, such as spiders, mites, ticks, centipedes, worms and the like.

As will be evident to those skilled in the art, various modifications on this invention can be made or followed, in the light of the foregoing disclosure and discussion, without departing from the spirit or scope of the disclosure or from the scope of the following claims.

I claim:
1. Method for killing insects which comprises contacting insects or their habitats with an insecticidally effective amount of the compound of the formula

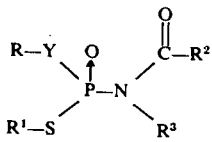

wherein R and $R^1$ individually are alkyl, alkenyl or alkynyl of up to 6 carbon atoms, $R^3$ is hydrogen or alkyl of 1 to 6 carbon atoms, $R^2$ is hydrogen, alkyl of 1 to 18 carbon atoms, cycloalkyl of 3 to 8 carbon atoms, alkenyl of 2 to 18 carbon atoms or alkynyl of 3 to 18 carbon atoms and Y is oxygen or sulfur.

2. The method of claim 1 wherein $R^3$ is hydrogen and Y is oxygen.

3. The method of claim 2 wherein $R^2$ is alkyl.

4. The method of claim 3 wherein $R^2$ is n-alkyl of up to 11 carbon atoms.

5. The method of claim 4 wherein $R^2$ is methyl or ethyl.

6. The method of claim 5 wherein R and $R^1$ are methyl, ethyl or allyl.

7. The method of claim 6 wherein, R, $R^1$ and $R^2$ are methyl.

8. The method of claim 6 wherein R and $R^1$ are methyl and $R^2$ is allyl.

9. The method of claim 2 wherein $R^2$ is hydrogen.

10. The method of claim 2 wherein $R^2$ is alkenyl.

11. Insecticidal composition comprising an insecticidally effective amount of the compound defined by the formula of claim 1 and a biologically inert carrier.

12. The composition of claim 11 wherein $R^3$ is hydrogen and Y is oxygen.

13. The composition of claim 12 wherein $R^2$ is alkyl.

14. The composition of claim 13 wherein $R^2$ is n-alkyl of up to 11 carbon atoms.

15. The composition of claim 14 wherein $R^2$ is methyl or ethyl.

16. The composition of claim 15 wherein R and $R^1$ are methyl, ethyl or allyl.

17. The composition of claim 16 wherein R, $R^1$ and $R^2$ are methyl.

18. The composition of claim 16 wherein R and $R^1$ are methyl and $R^2$ is allyl.

19. The composition of claim 12 wherein $R^2$ is hydrogen.

20. The composition of claim 12 wherein $R^2$ is alkenyl.

* * * * *